United States Patent [19]
Dome et al.

[11] Patent Number: 4,869,882
[45] Date of Patent: Sep. 26, 1989

[54] RECOVERY OF SODIUM CARBONATE VALUES FROM CONTAMINATED DILUTE SODA ASH STREAMS

[75] Inventors: Ernest M. Dome; Joel C. Baker, both of Green River, Wyo.; Thanassi E. Fakatselis, Hindale, Ill.

[73] Assignee: General Chemical Corporation, Parsippany, N.J.

[21] Appl. No.: 139,448

[22] Filed: Dec. 30, 1987

[51] Int. Cl.$^4$ .......................... C22B 26/10; C01D 7/00
[52] U.S. Cl. .............................. 423/206 T; 23/302 T; 423/421
[58] Field of Search .................... 423/152, 206 T, 421; 23/302 T

[56] References Cited

U.S. PATENT DOCUMENTS

| | | | |
|---|---|---|---|
| 1,994,892 | 3/1935 | MacMullin et al. | 423/421 |
| 2,049,249 | 7/1936 | Cunningham | 423/421 |
| 2,267,136 | 12/1941 | Robertson | 23/302 T |
| 3,838,189 | 9/1974 | Sopchak et al. | 423/421 |
| 3,953,073 | 8/1976 | Kube | 23/302 T |
| 4,039,617 | 8/1977 | Kuo | 423/206 T |
| 4,039,618 | 8/1977 | Gancy et al. | 423/421 |
| 4,738,836 | 4/1988 | Poncha et al. | 423/206 T |

OTHER PUBLICATIONS

Olsen, J. C., Unit Process and Principles of Chemical Engineering, D. Van Nostrand Co., NY NY, 1932 pp. 1–3.

*Primary Examiner*—Gary P. Straub
*Attorney, Agent, or Firm*—Brumbaugh, Graves, Donohue & Raymond

[57] ABSTRACT

Soda values are recovered from waste water and impurities are rejected to bitterns ponds by a low temperature crystallization process. In the process, waste water, typically containing 7–14% equivalent soda ash, is reacted with lime to neutralize bicarbonate. The liquor is subsequently clarified and fed into a multiple effect evaporator cooling circuit where it, along with the recirculating cooling water, is heated. The heated clarified liquid is then fed to an evaporative cooling system. Water is evaporated in the cooling tower and the liquor is cooled. The effluent liquor from this system now contains 17–24% soda ash. Most of this stream is recycled back to the multiple effect evaporator's cooling circuit for reheating. Approximately 10% of this stream is fed forward to an air cooled cooler-crystallizer where sodium carbonate decahydrate is crystallized. The decahydrate crystallized is relatively pure, while the sulfate is concentrated in the mother liquor. The resulting slurry is fed to a solid/liquid separation system where the mother liquor is separated from the decahydrate crystals. The crystals are washed to further remove impurities, dissolved with soda ash liquor, and recycled back to the process. The mother liquor and wash water are recycled to the multiple effect condensate cooling circuit and a portion of the mother liquor is purged to maintain an acceptable impurity level.

7 Claims, 1 Drawing Sheet

RECOVERY OF SODIUM CARBONATE VALUES FROM CONTAMINATED DILUTE SODA ASH STREAMS

SPECIFICATION

The present invention relates to the recovery of sodium carbonate (soda values) from trona process waste water which, in addition to the value, contains various impurities from a soda ash manufacturing facility, such as $NaHCO_3$, $Na_2SO_4$, $NaCl$, $SiO_2$, C, as well as other constituents.

BACKGROUND OF THE INVENTION

In the manufacture of soda ash, a system of storage ponds has been used to accommodate large accumulation of waste water and by-products. These ponds are used to impound insolubles (grits and muds) contained in mined ore; reject impurities from the crystallizer systems; dispose of mine waste water and various plant utility system wastes; and provide cooling for the evaporator trains of the soda ash facility. The waste streams fed to these ponds contain a significant amount of soda value, along with various impurities such as $NaHCO_3$, $Na_2SO_4$, $NaCl$, $SiO_2$, C, etc. As the pond water cools, sodium carbonate decahydrate is precipitated in the ponds, which significantly reduces the total pond volume. This reduction in volume results in two major problems for a facility of substantial commercial size; first, the need for additional waste cells to impound insolubles; and second, inadequate evaporation and hence inadequate cooling of the water used for cooling purposes.

Accordingly there exists a need to alleviate this problem of vast accumulations of waste from soda ash manufacture, and numerous methods have been proposed to attain this goal. A further desirable object in addition to reducing waste accumulations, would be to recover the soda value lost to the pond. To do this effectively, however, it is necessary to reject the impurities found in the pond water, a major component of which is sulfate impurities.

SUMMARY OF THE INVENTION

In accordance with the present invention, an improved process is provided which substantially extends the pond life of a soda ash manufacturing facility by recovering a substantial quantity of the soda ash from waste heretofore deposited in such ponds. A further advantage of the system of the present invention is the improved capability of the process to reject impurities and to produce a soda ash product at a lower overall cost compared to conventionally processed material.

According to the process of the invention, soda ash is recovered from soda-containing waste streams as sodium carbonate decahydrate instead of as the conventional monohydrate. Relatively pure soda ash cannot be recovered as the monohydrate from soda ash solutions containing significant quantities of sulfate impurities due to the formation of burkeite crystals ($Na_2CO_3 \cdot 2Na_2SO_4$).

The problem of burkeite formation is alleviated through formation of the decahydrate in accordance with the invention. The decahydrate crystals effectively reject the soluble sulfate impurities present in the mother liquor.

In the process of the invention, soda-containing waste water is first neutralized and clarified. A clarified stream is then combined with a stream of concentrated waste water recycled from down stream in the process. The combined stream is then heated to above about 50° C. and fed to a cooling tower where water is evaporated to yield a concentrated effluent. This effluent is split into two streams, one being the recycle stream that is combined with the clarified waste water and the other being fed to a crystallizer where a slurry of sodium carbonate decahydrate crystals is formed and the crystals are then separated.

Advantageously, relatively low temperature concentration and crystallization of solids may be effected through the utilization of an air cooled spray (ARCS) evaporator/crystallizer.

DETAILED DESCRIPTION OF THE INVENTION

Figure 1:
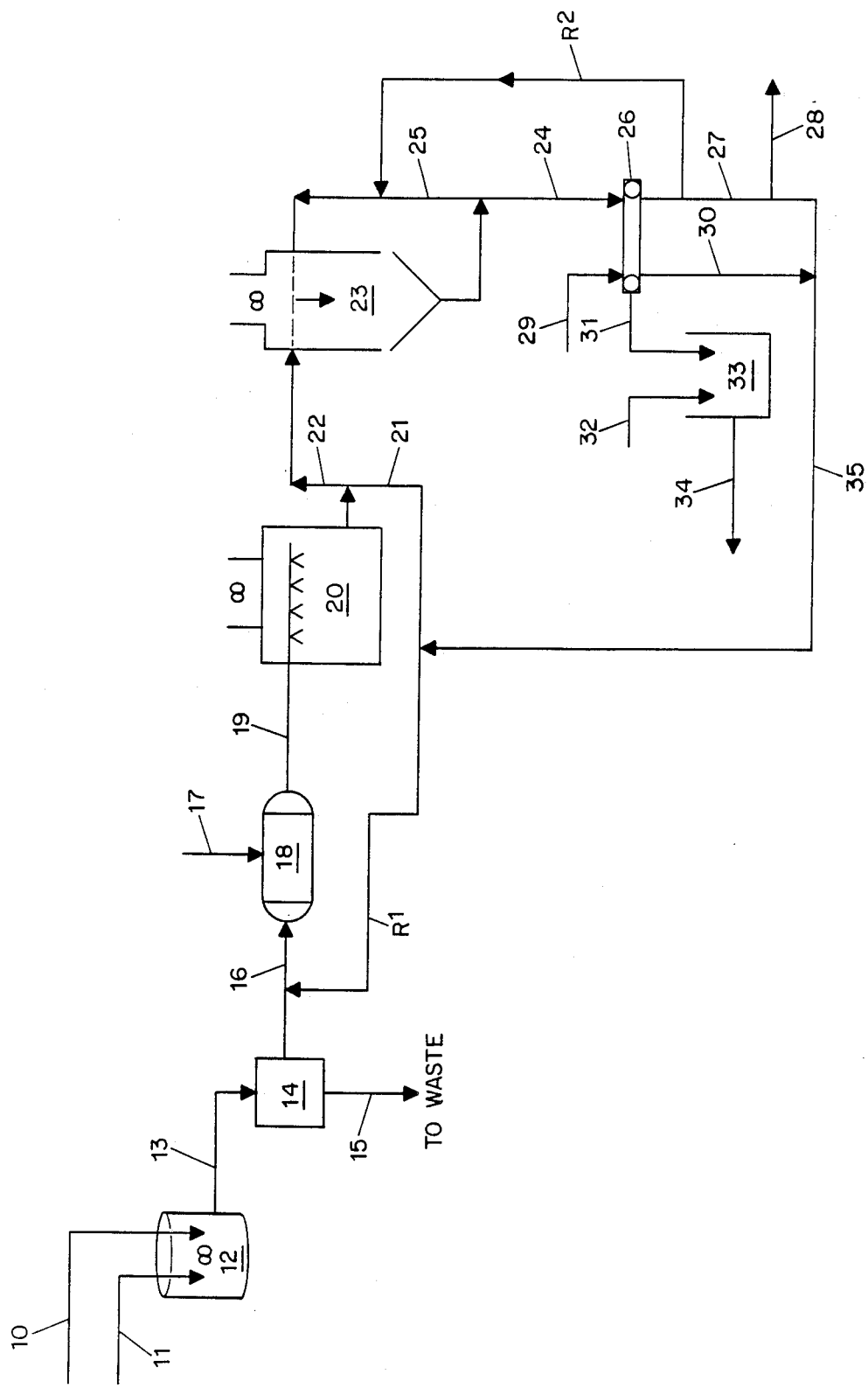
FIG. 1 is a flow diagram which schematically illustrates the process of the invention.

The process of the present invention, wherein soda values are recovered from waste water from a soda ash manufacturing facility and impurities are rejected to a bitterns pond involves a novel approach to low temperature crystallization which is described in more detail hereinafter with reference to FIG. 1. In general, however, the process comprises the following sequence of steps:

(1) Waste water containing soda ash is reacted with lime to neutralize the bicarbonate. Typical industrial soda ash concentrations in waste water from a soda ash manufacturing plant are on the order of 7–14%, and these materials are directly usable in the process of the invention. The liquor is subsequently clarified.

(2) The clarified liquor is combined with a recirculated stream of concentrated waste water and heated to above about 50 ° C. approximately 52° C. (125° F.). Heating is advantageously done with waste steam from elsewhere in the plant, such as waste steam from a multiple effect evaporator used in the manufacture of sodium carbonate monohydrate crystals.

(3) The heated, clarified liquor is then fed to a multi-stage evaporative cooling system—such as a counter-current cooling tower which has been modified by the removal of fill from the bottom section. Water is evaporated in the cooling tower and the liquor is cooled to about 30° C., or below, say approximately 29° C. (85° F.). This system is operated to maximize evaporation of water, and the concentrated effluent stream contains approximately 17–24% soda ash.

(4) Most of this stream is recycled for combination with the stream of clarified liquor for reheat ing. Approximately 10% of the concentrated effluent stream is fed forward and crystallized, for example in a vacuum evaporative crystallizer using brine chilling of the condenser or in an air-cooled cooler-crystallizer, to form sodium carbonate decahydrate crystals. A spray type crystallizer evaporator, such as units available from Swenson Process Equipment Inc., Harvey, Ill., U.S.A., may be advantageously used. A significant benefit of this process is that the crystallized decahydrate is relatively pure, while the sulfate is concentrated in the mother liquor.

(5) The resulting slurry is fed to a solid/liquid separation system where the mother liquor is separated from the decahydrate crystals. The crystals are washed to further remove impurities, dissolved with soda ash liquor, and recycled back for further processing to recover the soda ash value. The mother liquor and wash water are recycled for combination with the clarified liquor and a portion of the mother liquor is purged to maintain an acceptable impurity level.

The invention will be further described by reference to the accompanying flow diagram.

Waste water 10, typically containing 7-14% equivalent soda ash, is mixed with lime slurry 11 in an agitator tank 12 to neutralize any bicarbonate present. The neutralized liquor 13 flows to a clarifier 14 where solids are allowed to settle and are disposed of to a waste stream 15.

The clarified liquor stream 16 is combined with a recycled stream $R^1$ of concentrated waste water and fed to an evaporator condenser 18 where the combined stream is heated to above approximately 50° C. (125° F.). Waste steam 17 from a multiple effect evaporator (not shown) used in the manufacture of the sodium carbonate monohydrate crystals is advantageously used for heating.

The heated liquor 19 is fed to a cooling tower 20 in which water is evaporated and the liquor is cooled to approximately 30° C. (85° F.) or below. The effluent liquor from the cooling tower 20 contains 17-24% soda ash. About 90% of this liquor is recycled via stream 2 for combination with the stream of clarified liquor 16 entering condenser 18, for reheating. The remainder is fed via stream 22 to a conventional or air cooled evaporator crystallizer 23 where a slurry of crystalline sodium carbonate decahydrate is formed. Most of the slurry recovered from the crystallizer 23 is recycled (stream 25) and reintroduced to the crystallizer 23 to control crystal size and maintain proper solids content in the slurry. The remainder of the slurry 24 is fed to a belt filter 26 where mother liquor 27 is separated from the decahydrate crystals 31. Other conventional liquid/solid separation equipment, such as a centrifuge, or a rotary drum filter, can be used in place of or, in addition to the belt filter. It is important that such equipment has a substantially efficient washing capability along with the ability to keep wash water and mother liquor separated. The crystals are washed with water 29 to remove impurities remaining on the crystals. The mother liquor 27 and impure wash water 30 are recycled at R2 to the evaporator crystallizer and at 35 for combination with the clarified liquor entering condenser 18. A small portion of the mother liquor 28 is purged from the system to maintain an acceptable impurity level.

The decahydrate crystals 31 are re-dissolved by heating to above about 50° C. (122° F.) using a suitable heat source 32 such as from recycled crystallizer feed or steam, in an agitator tank 33 and the solution is returned to the soda ash process (not shown) via stream 34.

The invention provides a variety of advantages in the processing and an economy in the manufacture of soda ash. The process of the invention affords the distinct benefits of rejecting sulfate and recovering relatively pure soda ash (as decahydrate) from an impure dilute soda ash solution containing significant quantities of sodium sulfate (waste water). Furthermore, the process makes important practical use of a waste heat source to evaporate water and is easily retrofittable into existing operations.

The first of the above advantages results from the use of a decahydrate route for soda ash recovery instead of the conventional monohydrate route. Relatively pure soda ash cannot be recovered as the monohydrate from soda ash solutions containing significant quantities of sulfate impurities due to the formation of burkeite crystals ($Na_2CO_3 \cdot 2Na_2SO_4$) This problem is eliminated through the formation of the decahydrate in accordance with the invention. Also, as disclosed in U.S. Pat. No. 4,039,617, the decahydrate crystals will effectively reject the soluble sulfate impurities present in the mother liquor.

The second of the above stated advantages results from the use of a low temperature concentration and crystallization of solids in the proposed process. Concentration of the liquid feed may be preferably achieved by the removal of water through humidification of air, which is drawn into the vessel through openings in the sides and discharged at the top by a fan. The water is vaporized by known suitable means, e.g., by heat supplied to the recirculating slurry via a shell-and-tube type heat exchanger in which waste steam is condensed or warm water is cooled. A cooling tower is advantageously used to effect a low energy evaporation which permits a practical operation. A relatively low horse power electric motor/fan blowing air through a water stream may be conveniently used to effect the evaporation for the cooling required.

The concentration of the dilute soda ash stream allows the crystallizer to operate at a reasonably high temperature to effect crystallization of the decahydrate. The crystallizer section effects an evaporation of water to remove the heat of crystallization of decahydrate crystals; no external heat is added to the crystallization section. Any suitable evaporator/crystallizer of this kind may be employed, such as that obtained, for example, from the Swenson Division of The Henley Group. This may be accomplished through the use of either a standard evaporator cooler or an air cooled spray (ARCS) evaporator/crystallizer. In an ARCS system, a forced-circulation evaporator-crystallization and separation of the mixed-suspension is effected.

It will be understood the invention should not be limited to the specific details provided in the illustrative operation of the improved process of the invention, presented to afford a more complete description of the invention, except as such details may be expressed in the claims which follow.

We claim:

1. A process from recovering soda ash value from a waste stream derived from soda ash production from trona ore comprising soda ash, sodium bicarbonate, impurities rejected from soda ash crystallizer systems, and process waste waters which comprises:
    (a) neutralizing with lime or CaO the bicarbonate impurity content of the waste stream;
    (b) clarifying the neutralized waste stream to remove suspended solids;
    (c) heating the clarified waste stream to above 50° C.;
    (d) cooling the heated waster stream to a temperature of below approximately 30° C. while evaporating water from the waster stream to yield an effluent liquor containing from about 17 to 24 percent soda ash;
    (e) feeding a portion of the effluent liquor stream to a crystallizer where a slurry of sodium carbonate decahydrate crystals is formed while recycling the balance of the effluent liquor stream and combining said recycled stream with the neutralized waste stream following clarification; and
    (f) separating the sodium carbonate decahydrate crystals from the slurry.

2. The method of claim 1 further comprising, washing separated crystals with water, and recycling at least a part of the wash liquor therefrom and combining said recycled wash liquor with the neutralized liquor following clarification.

3. The method of claim 2, wherein a portion of the wash liquor is purged to control the impurity level in the recovery cycle.

4. A method according to claim 1, wherein the neutralized waste stream is heated in the cooling circuit of an evaporator/cooler being used in some other process.

5. A method according to claim 4, wherein the neutralized waste stream is heated in the cooling circuit of a third effect evaporator being used in the manufacture of sodium carbonate monohydrate.

6. A method according to claim 1, wherein the waste stream contains 7-14% soda ash.

7. A method according to claim 1, wherein about 10% of the effluent liquor is fed to the crystallizer.

* * * * *

UNITED STATES PATENT AND TRADEMARK OFFICE
CERTIFICATE OF CORRECTION

PATENT NO.   :   4,869,882
DATED        :   September 26, 1989
INVENTOR(S)  :   E.M. Dome et al.

It is certified that error appears in the above-identified patent and that said Letters Patent is hereby corrected as shown below:

Col. 1, line 9, "value" should read --soda value--;

Col. 2, line 38, after "50°C." insert -- , say--;

Col. 2, line 54, "reheat ing " should read --reheating--;

Col. 3, line 26, "stream 2" should read -stream 21--;

Col. 4, line 46, "process from" should read --process for--;

Col. 4, line 56, "waster" should read --waste--.

Signed and Sealed this

Twenty-eighth Day of August, 1990

Attest:

HARRY F. MANBECK, JR.

*Attesting Officer*        *Commissioner of Patents and Trademarks*